US010604425B2

(12) United States Patent
Golembiewski et al.

(10) Patent No.: US 10,604,425 B2
(45) Date of Patent: Mar. 31, 2020

(54) MEMBRANE SEPARATION METHOD WITH SPEED CONTROL OF PRESSURE EXCHANGER AND FEED PUMP

(71) Applicant: KSB Aktiengesellschaft, Frankenthal (DE)

(72) Inventors: Wojciech Golembiewski, Frankenthal (DE); Andreas Wieland, Frankenthal (DE)

(73) Assignee: KSB Aktiengesellschaft, Frankenthal (DE)

(*) Notice: Subject to any disclaimer, the term of this patent is extended or adjusted under 35 U.S.C. 154(b) by 704 days.

(21) Appl. No.: 15/022,989

(22) PCT Filed: Sep. 19, 2014

(86) PCT No.: PCT/EP2014/069980
§ 371 (c)(1),
(2) Date: Mar. 18, 2016

(87) PCT Pub. No.: WO2015/040153
PCT Pub. Date: Mar. 26, 2015

(65) Prior Publication Data
US 2016/0229713 A1 Aug. 11, 2016

(30) Foreign Application Priority Data

Sep. 20, 2013 (DE) ................. 10 2013 218 965

(51) Int. Cl.
C02F 1/44 (2006.01)
B01D 61/12 (2006.01)
(Continued)

(52) U.S. Cl.
CPC ............. C02F 1/441 (2013.01); B01D 61/06 (2013.01); B01D 61/12 (2013.01); C02F 1/008 (2013.01);
(Continued)

(58) Field of Classification Search
CPC .. B01D 61/06; B01D 61/12; B01D 2313/243; B01D 2311/16; C02F 1/441; C02F 1/008;
(Continued)

(56) References Cited

U.S. PATENT DOCUMENTS 5,482,441 A 1/1996 Permar
7,988,428 B1 8/2011 MacHarg
(Continued)

FOREIGN PATENT DOCUMENTS

CN 102138007 A 7/2011
DE 10 2007 048 316 A1 4/2009
(Continued)

OTHER PUBLICATIONS

English translation of Japanese Office Action issued in counterpart Japanese Application No. 2016-543409 dated Jul. 27, 2018 (seven (7) pages).

(Continued)

Primary Examiner — Vishal V Vasisth
(74) Attorney, Agent, or Firm — Crowell & Moring LLP

(57) ABSTRACT

The invention relates to a method for treating a liquid. A feed stream is separated into a permeate stream and a retentate stream by means of a member arrangement. At least a portion of the retentate stream is discharged from the member arrangement via a displacer arrangement as a defined displacer volume. The feed stream is divided into a portion that is fed into the membrane arrangement via a displacer arrangement as a defined displacer volume and into a portion that is fed to the membrane arrangement by means of a conveying unit. The yield is varied by changing the ratio of the speed of the conveying unit to the speed of the displacer arrangement.

6 Claims, 2 Drawing Sheets

(51) Int. Cl.
   *B01D 61/06* (2006.01)
   *C02F 1/00* (2006.01)
   *C02F 103/08* (2006.01)
(52) U.S. Cl.
   CPC .... *B01D 2311/16* (2013.01); *B01D 2313/243* (2013.01); *C02F 2103/08* (2013.01); *C02F 2209/02* (2013.01); *C02F 2209/03* (2013.01); *C02F 2209/05* (2013.01); *C02F 2209/40* (2013.01)
(58) Field of Classification Search
   CPC .............. C02F 2103/08; C02F 2209/03; C02F 2209/05; C02F 2209/40; C02F 2209/02
   See application file for complete search history.

(56) References Cited

U.S. PATENT DOCUMENTS

| | | |
|---|---|---|
| 2006/0037895 A1 | 2/2006 | Shumway |
| 2010/0239687 A1 | 9/2010 | Kim et al. |
| 2010/0269687 A1 | 10/2010 | Krogh et al. |
| 2011/0006006 A1 | 1/2011 | MacHarg |
| 2011/0203987 A1 | 8/2011 | Friedrichsen et al. |
| 2013/0037464 A1 | 2/2013 | Friedrichsen et al. |
| 2014/0374356 A1 | 12/2014 | Went et al. |

FOREIGN PATENT DOCUMENTS

| | | |
|---|---|---|
| DE | 10 2008 044 869 A1 | 3/2010 |
| DE | 10 2008 046 168 A1 | 3/2010 |
| DE | 10 2009 020 932 A1 | 11/2010 |
| DE | 10 2010 009 581 A1 | 9/2011 |
| DE | 10 2011 005 964 A1 | 12/2011 |
| DE | 10 2010 052 067 A1 | 5/2012 |
| DE | 10 2011 114 093 A1 | 3/2013 |
| DE | 10 2011 116 864 A1 | 4/2013 |
| EP | 1 986 766 B1 | 3/2011 |
| FR | 2 790 040 A1 | 8/2000 |
| JP | 2000-64950 A | 3/2000 |
| JP | 2000-154775 A | 6/2000 |
| JP | 2010-63976 A | 3/2010 |
| JP | 2013-199837 A | 10/2013 |
| WO | WO 95/34756 A1 | 12/1995 |
| WO | WO 00/50773 A2 | 8/2000 |
| WO | WO 2010/022726 A1 | 3/2010 |

OTHER PUBLICATIONS

International Preliminary Report on Patentability (PCT/IB/338 & PCT/IB/373) issued in PCT Application No. PCT/EP2014/069980 dated Mar. 31, 2016, including English translation of document C2 (German-language Written Opinion (PCT/ISA/237)) previously filed on Mar. 18, 2016 (sixteen (16) pages).

International Search Report (PCT/ISA/210) issued in PCT Application No. PCT/EP2014/069980 dated Mar. 5, 2015, with English translation (ten (10) pages).

German-language Written Opinion (PCT/ISA/237) issued in PCT Application No. PCT/EP2014/069980 dated Mar. 5, 2015 (ten (10) pages).

German Office Action issued in counterpart German Application No. 10 2013 218 965.6 dated Jun. 12, 2014 (four (4) pages).

MEMBRANE SEPARATION METHOD WITH SPEED CONTROL OF PRESSURE EXCHANGER AND FEED PUMP

CROSS REFERENCE TO RELATED APPLICATIONS

This application is a continuation of PCT International Application No. PCT/EP2014/069980, filed Sep. 19, 2014, which claims priority under 35 U.S.C. § 119 from German Patent Application No. 10 2013 218 965.6, filed Sep. 20, 2013, the entire disclosures of which are herein expressly incorporated by reference.

BACKGROUND AND SUMMARY OF THE INVENTION

The invention relates to a method for treating a liquid, wherein a feed stream is separated into a permeate stream and a retentate stream by means of a membrane arrangement and at least a portion of the retentate stream is discharged from the membrane arrangement as a defined positive displacement volume by means of a positive displacement arrangement.

The liquid can be a solution in which substances, e.g. salts, have been dissolved or finely distributed, for example. Treatment of liquids is necessary for the production of numerous products. Membrane separation methods are especially advantageous since they do not require heating and are generally more favorable in terms of energy than thermal separation methods. For this purpose, a membrane module is fed with a feed stream, which is divided into a retentate stream and a permeate stream. In the separation process, the retentate stream is retained by the membrane. The permeate stream passes through the membrane.

Separation by means of membrane methods has become established in food technology, biotechnology and pharmacy, among others. Depending on the type of membranes used, selective separation of individual substances or certain mixtures of substances is possible.

Among membrane separation methods, distinctions are made according to the driving force behind separation. The present invention relates to pressure-driven processes. An arrangement passes the feed stream to a membrane module. In this case, the arrangement builds up a pressure in front of a semipermeable membrane. The size of the substances retained can be set by means of the choice of membrane. Depending on the size of the molecules retained, a distinction is drawn between microfiltration, ultrafiltration, nanofiltration and reverse osmosis.

The method according to the invention and the system according to the invention prove particularly advantageous in carrying out reverse osmosis, especially in seawater desalination. The liquid is subjected to a pressure which is above the osmotic pressure, and water molecules diffuse through the membrane, while the dissolved salts are retained. Thus, the salt solution, which is referred to as the retentate, is concentrated on one side while desalinated drinking water, which is referred to as the permeate, is obtained on the other side.

The invention relates to a system for treating a liquid in which a positive displacement arrangement is used for energy recovery. In such positive displacement systems, the liquid is delivered by self-contained volumes. In this case, pressure is transferred from the retentate stream to the feed stream. Such positive displacement arrangements are used in small to medium-sized seawater desalination systems since they ensure high pressures, even at small volume flows.

In these positive displacement systems, the permeate stream obtained is dependent on the speed and positive displacement volume per revolution. In these systems, control of the yield is possible only by means of a bypass or drain valve in the high-pressure part. Such control leads to an increase in specific energy consumption.

DE 10 2011 005 964 A1 describes a method for treating a liquid in which a pump passes a feed stream to a membrane unit. In the membrane unit, the feed stream is separated into a permeate stream and a retentate stream. From process data, an evaluation unit calculates the optimum yield at which the system can be operated with a minimum specific energy requirement.

A reverse osmosis system is described in EP 1 986 766 B 1. A positive displacement pump delivers the feed stream to a membrane unit. After the membrane unit, the retentate flows through a pressure recovery unit. The pressure recovery unit is connected to a motor which, in turn, is connected to the positive displacement pump. The pressure upstream of the inlet of the feed stream into the membrane unit and downstream of the outlet of the retentate stream is measured by means of sensors. The speed of the motor connected to the positive displacement pump and to the pressure recovery unit is controlled in accordance with the difference between these pressures. Variation of the yield is possible only by means of a bypass or drain valve. This leads to energy losses.

It is the object of the invention to indicate a method for treating a liquid which, while using a positive displacement system, ensures flexible and energy-efficient operation. At the same time, it should be possible to set an optimum operating point with energy and volume losses which are as small as possible. The method according to the invention is intended to allow different modes of operation, e.g. cost-efficient, energy-saving or membrane-preserving operation. This involves efficient use of the membrane, energy and water pretreatment, e.g. by means of chemicals.

According to the invention, this object is achieved by virtue of the fact that the feed stream is divided into a portion that is fed to the membrane arrangement as a defined positive displacement volume by means of a positive displacement arrangement and into a portion that is fed to the membrane arrangement by means of a delivery unit, wherein the yield is varied by changing the ratio of the speed of the delivery unit to the speed of the positive displacement arrangement. The speeds of the shafts can be varied independently of one another.

In the system according to the invention, both the positive displacement pump and the delivery unit have a dedicated shaft for driving. Thus, in the system according to the invention, two rotary machines are used in parallel to supply the feed stream. The delivery unit is preferably a high-pressure pump, preferably a centrifugal pump. The positive displacement arrangement is a positive displacement pump, preferably an axial piston pump.

Different modes of operation of the system also allow different production rates of treated liquid. While keeping the membrane area the same, the permeate stream can be increased by increasing the pressure in the system. For this purpose, a variable-speed positive displacement or centrifugal pump is used as a delivery unit, for example, which can supply an increasing volume flow as the pressure in the system rises. Similarly, the permeate stream can be reduced by reducing the speed of the delivery unit.

An energy-efficient mode of operation of the system can allow for the possibility of using power from solar or wind energy, for example, when available.

The delivery unit is arranged in parallel with the positive displacement pump, allowing the feed stream to be divided into a portion which flows through the positive displacement pump and a portion which flows through the delivery unit.

At least one shaft is connected to a device for changing the speed. The device is preferably an electric motor that has a frequency converter. The system has a unit which is designed for speed variation. This can be an evaluation and/or open-loop and/or closed-loop control unit.

The arrangement of a variable-speed delivery unit in parallel with a positive displacement pump enables the ratio of the two partial streams to be selectively split. With the aid of process data detected by sensors, the actual state of the system can be determined and adjusted to the optimum operating point by means of the unit.

It is thereby possible to set an optimum operating point with low energy and volume losses. The method according to the invention for operating the liquid treatment system makes possible different modes of operation, e.g. an energy-saving mode or a membrane-preserving mode.

In an advantageous embodiment of the invention, the yield of the liquid treatment system is varied by changing the ratio of the speed of the positive displacement pump to the speed of the delivery unit connected in parallel therewith. By way of the ratio of the speed of the delivery unit to the speed of the positive displacement arrangement connected in parallel therewith, it is possible to set an optimum yield without relatively large energy losses.

Once the optimum yield has been achieved, the desired discharge rate can be set. In this process, the ratio of the speeds between the positive displacement arrangement and the delivery unit connected in parallel is held constant, and the overall speed is either increased or reduced.

In a particularly advantageous embodiment of the invention, the positive displacement arrangement for supplying the feed stream and the positive displacement arrangement for energy recovery from the retentate stream are operated at the same speed. Both positive displacement arrangements are preferably driven by a common shaft arrangement. The shaft arrangement is connected to an electric motor, the speed of which can be changed.

In an advantageous variant of the invention, at least one positive displacement arrangement has a drum with cylinders, in which pistons are arranged. This can be an axial piston pump and/or an axial piston motor. In this embodiment, the positive displacement arrangement comprises a swashplate. The pistons are connected to sliding shoes and have a surface that faces a swashplate. The swashplates are fixed and ensure that the pistons assume different positions during a rotary motion of the drums. In a particularly advantageous embodiment of the invention, the positive displacement volume fed to the membrane arrangement corresponds to the positive displacement volume discharged from the membrane arrangement.

It proves advantageous if both positive displacement arrangements are arranged in a modular unit. A distributor block is preferably positioned between the positive displacement arrangements. Here, the distributor block forms the central component which distributes the liquid streams. For this purpose, the distributor block preferably has a feed stream inlet and outlet and a retentate stream inlet and outlet. In this design, the electric motor which drives the positive displacement arrangements is arranged outside the modular unit consisting of the two positive displacement arrangements and the distributor block positioned centrally between them.

Other objects, advantages and novel features of the present invention will become apparent from the following detailed description of one or more preferred embodiments when considered in conjunction with the accompanying drawings.

DETAILED DESCRIPTION

Figure 1:
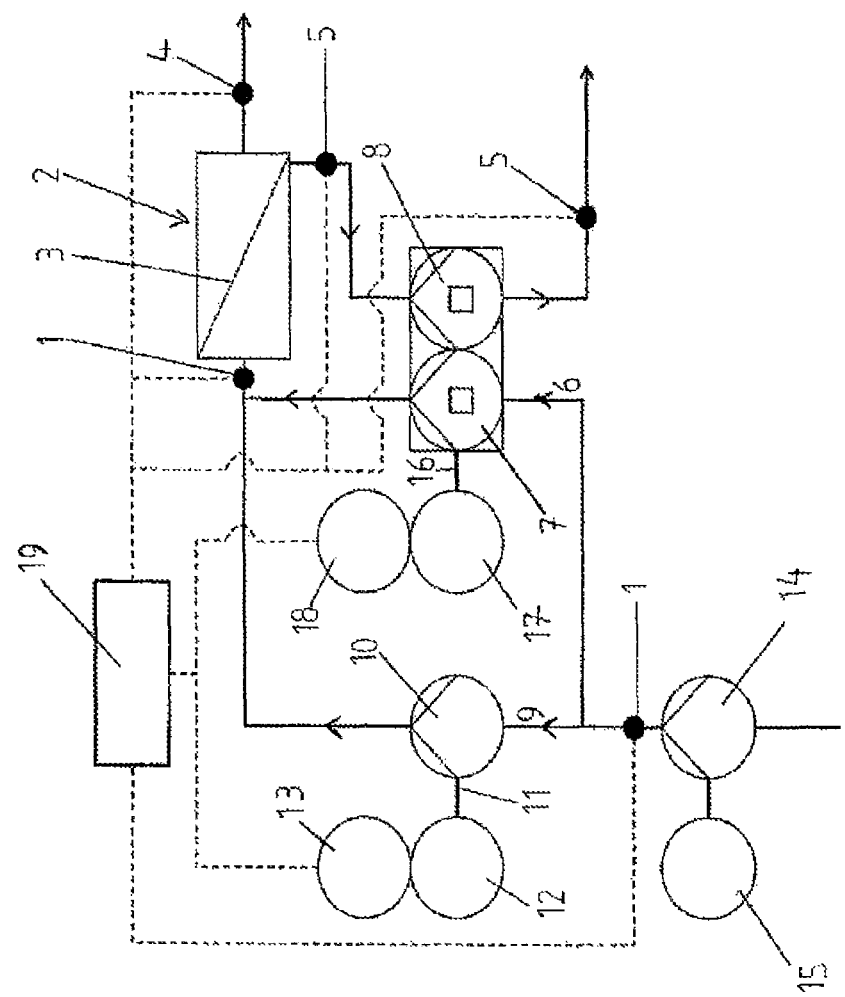
FIG. 1 shows a flow diagram of a system for seawater desalination in accordance with an embodiment of the present invention.

FIG. 1 shows a flow diagram of a system for seawater desalination.

Seawater is fed to a membrane arrangement 2 as a feed stream 1. The membrane arrangement 2 has a semipermeable membrane 3, which separates the feed stream 1 into a permeate stream 4 and a retentate stream 5. In the illustrative embodiment, the permeate stream 4 is drinking water and the retentate stream 5 is concentrated seawater.

Reverse osmosis (RO) takes place in the membrane arrangement 2. The pressure in the membrane arrangement in front of the semipermeable membrane 3 is higher than the osmotic pressure.

A portion 6 of the feed stream 1 is fed to the membrane arrangement 2 as a defined positive displacement volume by means of a positive displacement arrangement 7. The retentate stream 5 is discharged from the membrane arrangement 2 as a defined positive displacement volume by means of a positive displacement arrangement 8.

According to the invention, the feed stream 1 is divided, wherein a portion 9 of the feed stream 1 is fed to the membrane arrangement 2 by means of a delivery unit 10, and a portion 6 flows via positive displacement arrangement 7. In the illustrative embodiment, the delivery unit 10 is a high-pressure pump, which is driven by means of a motor 12 via a shaft arrangement 11. The motor 12 is connected to a frequency converter 13. In the illustrative embodiment, positive displacement arrangement 7 is an axial piston pump.

The feed stream 1 initially flows via an auxiliary pump 14 and is then divided into partial stream 6 and partial stream 9. The auxiliary pump 14 is driven by means of a motor 15.

In the illustrative embodiment, positive displacement arrangement 7 and positive displacement arrangement 8 are connected by a shaft arrangement 16. Connected to one end of the shaft arrangement 16 is an electric motor 17, which is connected to a frequency converter 18. According to the invention, the speed of the delivery unit 10 and/or the speed of a positive displacement arrangement 7, 8 is/are varied in order to set different operating states.

The yield is varied by changing the ratio of the speed of the delivery unit 10 to the speed of the positive displacement arrangement 7. The yield is the ratio of the permeate stream 4 to the feed stream 1.

In the illustrative embodiment, the positive displacement arrangements 7, 8 are operated at the same speed by means of a common shaft arrangement 16, and the positive displacement volume supplied via partial stream 6 is equal to the positive displacement volume discharged via the retentate stream 5. The permeate stream 4 therefore corresponds exactly to the partial stream 9 which is supplied by means of the delivery unit 10. By changing the speed of the delivery unit 10, it is thus possible selectively to vary the permeate stream 4 and thus the yield. If the speed is increased, the permeate stream 4 increases and the yield rises. If the speed of the delivery unit 10 is reduced, the permeate stream 4 falls and the yield decreases.

According to the invention, the system has a unit 19, which is designed for speed variation. The unit 19 is an open-loop control/closed-loop control/evaluation unit, which detects signals and emits signals. The unit 19 is connected to frequency converter 13 and frequency converter 18. Sensors are arranged at those points of the system which are shown as solid circles. By means of these sensors, process data are detected and transmitted to the unit 19. The process data are the temperature and/or salinity and/or pressure and/or volume flow at various points of the system. Thus, for example, the temperature, salinity, pressure and/or volume flow of the feed stream 1 are detected before division into the two partial streams 9, 6. The pressure and the temperature of the feed stream 1 are furthermore detected after the partial streams 9, 6 have been combined again, before entry to the membrane arrangement 2. The volume flow of the permeate stream 4 is also measured. The pressure and temperature of the retentate stream 5 are also measured before entry to positive displacement arrangement 8 and after emergence from positive displacement arrangement 8. All the process data are transmitted to the unit 19 as electrical signals.

From the process data, the unit 19 calculates the current yield and the optimum yield. By means of an algorithm, the unit 19 furthermore determines an optimum yield as a setpoint value, at which the system can be operated with a minimum energy requirement. The deviation of the actual value from the setpoint value gives a control difference. Depending on this control difference, the unit 19 changes the speed of the delivery unit 10 and/or the speed of the positive displacement arrangement 7, 8. It is thereby possible to selectively vary the yield and adapt it to its optimum operating point. In the system according to the invention, this is accomplished largely without energy losses since, in contrast to conventional positive displacement methods, no bypass valve or drain valve is used to set the yield.

The two positive displacement arrangements 7, 8 are integrated into a modular unit. This is shown as an axial section in FIG. 2. The central component of the modular unit is a distributor block 25, which is positioned between the two positive displacement arrangements 7, 8. The compact modular unit consisting of the two positive displacement arrangements 7, 8 and the distributor block 25 is held together with the aid of rod-type elements. In the illustrative embodiment, the rod-type elements are embodied as bars of round cross section. At least one end, the rod-type elements have a fastening means. In the illustrative embodiment, the fastening means are embodied as nuts with an internal thread, which are screwed onto external threads of the rod-type elements and thereby clamp the positive displacement arrangements 7, 8 and the distributor block 25 together to form a unit.

According to the invention, the electric motor 17 shown in FIG. 1 is connected by means of a shaft end outside the compact modular unit. The electric motor 17 is connected to a frequency converter 13.

The distributor block 25 is preferably of integral design. The distributor block 25 has an inlet opening for portion 6 of the feed stream 1 and an inlet opening for the retentate stream. The distributor block 25 is of cuboidal design. The outlet opening for portion 6 of the feed stream 1, which is not shown in the figures, is situated on the opposite side to the inlet opening for the feed stream. The outlet opening for the retentate stream 5 is situated on the opposite side to the inlet opening.

Figure 2:
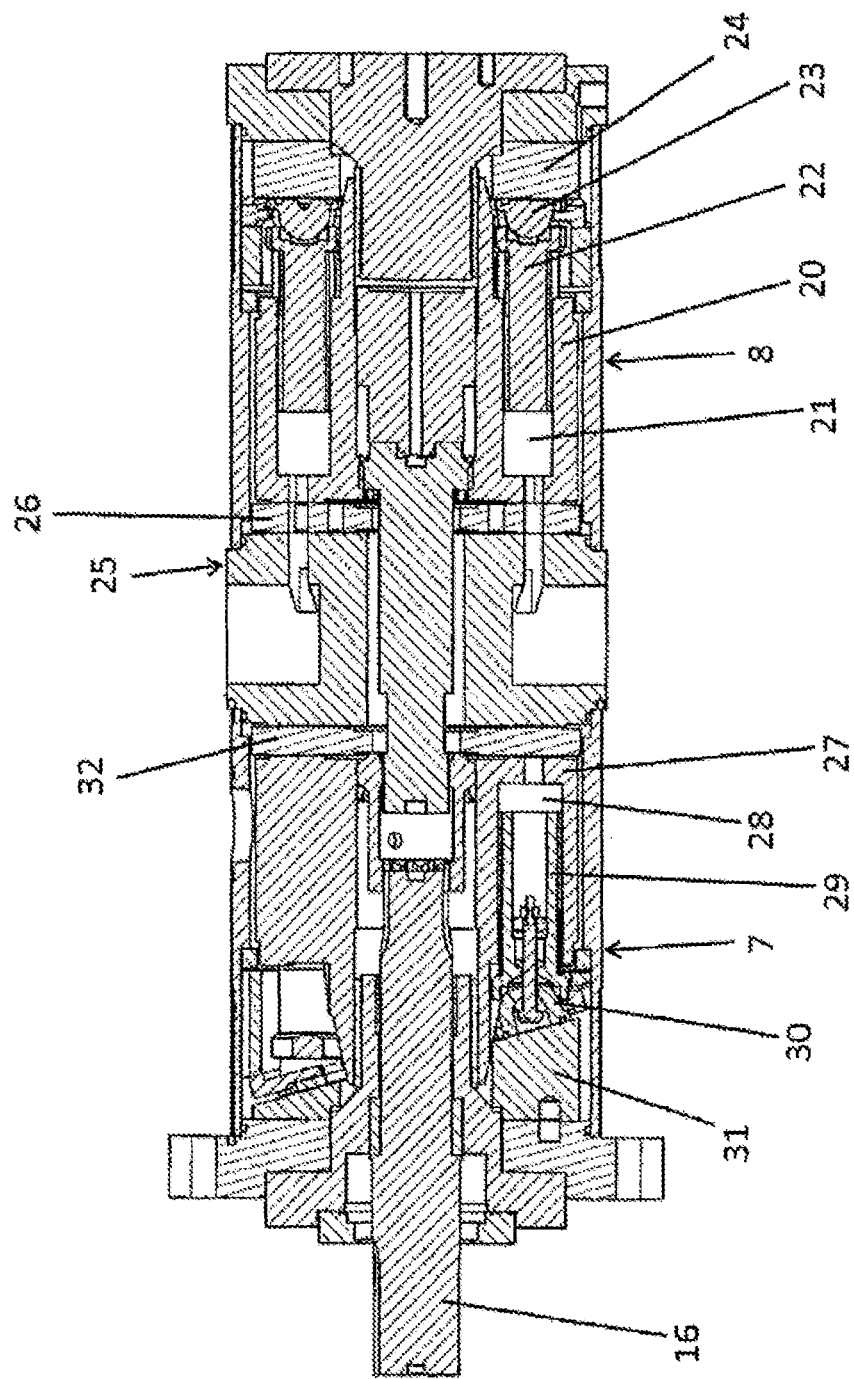
FIG. 2 shows an axial section through a unit comprising positive displacement arrangements in accordance with an embodiment of the present invention.

FIG. 2 shows that, for energy recovery from the retentate stream 5, positive displacement arrangement 8 has a drum 20 with cylinders 21, which are arranged along a circular circumference. Pistons 22 are arranged in the cylinders 21. Each piston 22 is connected to a sliding shoe 23. Each sliding shoe 23 has surfaces which face a swashplate 24. The surfaces are composed of polyetheretherketone (PEEK). This material allows lubrication between the swashplate 24 and the sliding shoes 23 by some of the medium in the retentate stream 5.

The swashplate 24 is arranged in a fixed manner on an adjoining component. The adjoining component has a cuboidal profile and, in the center thereof, has a bore, into which a cylinder-type component is inserted. The adjoining component has bores through which the rod-type elements project. Through the inlet opening, the retentate stream 5 flows into the cylinders 21 of the drum 20. The pistons 22 are thereby moved axially. This leads to a rotary motion of the drum 20. The drum 20 is connected for conjoint rotation to a shaft arrangement 16. In the illustrative embodiment, the shaft arrangement 16 consists of a plurality of elements.

A control disk 26 is arranged between the distributor block 25 and the drum 20. The control disk 26 has an arcuate opening. The drum 20 rotates together with the cylinders 21. The cylinders 21, which are connected to the arcuate opening in the control disk 26, are filled with retentate stream 5, which flows in through an opening.

The retentate stream 5 flows out of the cylinders 21, which are connected to an arcuate outlet opening in the control disk 26. The retentate stream 5 drives the drum 20.

The rotary motion of the drum 20 is transmitted directly to a drum 27 by the shaft arrangement 16 without the interposition of another component, e.g. an electric motor.

Drum 27 is connected for conjoint rotation to the shaft arrangement 16. Drum 27 has cylinders 28, which are arranged along a circular circumference. Pistons 29 are mounted in an axially movable manner in the cylinders 28.

The openings in the cylinders 21, 28 of both drums 20, 27 are oriented toward the distributor block 25.

The distributor block 25 preferably has four chambers spatially separated from one another. A chamber for the inflowing retentate stream 5, a chamber for the outflowing retentate stream 5, a chamber for the inflowing portion 6 of the feed stream 1 and a chamber for the outflowing portion 6 of the feed stream 1.

The chambers are spatially separated from one another, ensuring that there is no mixing between the streams. It proves advantageous here if each chamber has an inlet opening and an outlet opening for the respective stream, wherein two of the chambers have an opening which faces the cylinders 21 of one drum 20 and two chambers have an opening which faces the cylinders 28 of the other drum 27.

In a preferred embodiment of the invention, the distributor block 25 has a centrally arranged opening, through which the shaft arrangement 16 extends. The spatially enclosed chambers of the distributor block 25 are arranged around this central opening.

Each piston 29 is connected to a sliding shoe 30. The sliding shoes 30 have surfaces which face a swashplate 31. The surfaces are composed of polyetheretherketone (PEEK).

This material allows lubrication between the stationary parts and the moving parts by the medium in the feed stream.

The swashplate 31 is fixed and is connected to an adjoining component. The adjoining component has a disk-shaped profile and an opening in the center thereof, through which a cylinder-type component is inserted. The shaft arrangement 16 extends within this cylinder-type component. The end of the shaft arrangement 16 has a connection for the electric motor 17.

Drum 20 is set in motion by the retentate stream 5. The rotary motion is transmitted to drum 27 by the shaft arrangement 16. The rotary motion of drum 27 causes the pistons 29 to move in the cylinders 28 of drum 27 and deliver portion 6 of the feed stream 1. Portion 6 of the feed stream 1 enters the distributor block 25 through an opening. A control disk 32 is arranged between the distributor block 25 and drum 27. Control disk 32 has an arcuate inlet opening and an arcuate outlet opening. The inlet openings and outlet openings of control disk 32 are offset by 90° relative to the inlet openings and outlet openings of control disk 26. Portion 6 of the feed stream 1 flows into the cylinders 28 of drum 27 through the inlet opening in control disk 32. In this process, portion 6 of the feed stream 2 is drawn in by means of an opening movement of the pistons 29. Drum 27 with the cylinders 28 continues to rotate. By means of the cylinders 28, which are connected to the outlet opening in control disk 32, portion 6 of the feed stream 1 is forced out of the cylinders 28 by means of the pistons 29.

The retentate stream 5 enters the modular unit at a high pressure and leaves it at a lower pressure. Portion 6 of the feed stream 1 enters the modular unit at a low pressure and leaves it at a higher pressure. In the modular unit, pressure is transferred from the retentate stream 5 to portion 6 of the feed stream 1.

The electric motor 17 supplies energy via the shaft arrangement 16, this energy being lost owing to the pressure loss in the membrane arrangement 2.

The device has passages, some of them in the form of bores, through which a portion of the retentate stream 5 and a portion of the feed stream 1, respectively, are carried to gaps between fixed and moving components, e.g. between the fixed swashplates 24, 31 and the surfaces of the sliding shoes 23, 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for treating a liquid, comprising the acts of:
separating a feed stream into a permeate stream and a retentate stream in a membrane arrangement;
feeding at least a portion of the retentate stream from the membrane arrangement into a first positive displacement arrangement;
prior to separating the feed stream in the membrane arrangement, dividing the feed stream into
a first portion fed into the membrane arrangement from a second positive displacement arrangement as a positive displacement volume, the second positive displacement arrangement being coupled to the first positive displacement arrangement such that when the portion of the retentate stream is fed into the first positive displacement arrangement, the first positive displacement arrangement drives the second positive displacement arrangement, and
a second portion fed to the membrane arrangement by a delivery unit;
varying a yield amount of the permeate stream relative to an amount of feed stream fed into the membrane arrangement using an evaluation unit configured to change a ratio of a speed of the delivery unit to a speed of the second positive displacement arrangement; and
varying a discharge volume of the retentate from the membrane arrangement using the evaluation unit to change the speeds of the delivery unit and the second positive displacement arrangement while maintaining the ratio of the speed of the delivery unit and the speed of the second positive displacement arrangement constant.

2. The method as claimed in claim 1, further comprising the acts of:
determining parameters of the feed stream including at least one of the feed stream salinity, temperature and pressure; and
selecting a mode of operation from at least one of a low pressure operating mode, a low chemical consumption mode and an operating mode based on a current availability of energy for performing the method,
wherein the evaluation unit adapts the ratio of the speeds of the delivery unit and the second positive displacement arrangement based on the selected mode of operation, the determined feed stream parameters, and membrane arrangement parameters including at least a permeability of the membrane and an effective surface area of the membrane, to obtain a target permeate stream yield amount.

3. The method as claimed in claim 2, wherein the first and second positive displacement arrangements operate at the same speed.

4. The method as claimed in one of claim 3, wherein
the feed stream positive displacement volume fed to the membrane arrangement is equal to a retentate stream volume discharged from to the membrane arrangement.

5. The method as claimed in claim 4, wherein
the evaluation unit determines a deviation of a current actual permeate stream yield amount from the target permeate stream yield amount, and
the evaluation unit varies the speed of at least one of the delivery unit and the first positive displacement arrangement to minimize the deviation from the target permeate stream yield amount.

6. The method as claimed in claim 5, wherein
the first positive displacement unit is arranged to transfer pressure energy from the portion of the retentate stream fed into the first positive displacement to the first portion of the feed stream in the second positive displacement arrangement.

* * * * *